US007501936B2

(12) United States Patent
Zagler

(10) Patent No.: US 7,501,936 B2
(45) Date of Patent: Mar. 10, 2009

(54) METHOD AND SYSTEM FOR FACILITATING ENTRY INTO OR OUT OF A MOTOR VEHICLE

(75) Inventor: Werner Zagler, Krailling (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 734 days.

(21) Appl. No.: 09/803,360

(22) Filed: Mar. 12, 2001

(65) Prior Publication Data

US 2001/0033223 A1 Oct. 25, 2001

(30) Foreign Application Priority Data

Mar. 10, 2000 (DE) ................................ 100 11 851

(51) Int. Cl.
*B60R 25/10* (2006.01)
*G08B 21/00* (2006.01)
*G05B 23/00* (2006.01)

(52) U.S. Cl. ............................. 340/426.1; 340/426.36; 340/686.1; 340/3.1; 340/5.2; 340/5.6; 340/5.64

(58) Field of Classification Search .............. 340/425.5, 340/426.1; 701/36, 49; 307/10.1
See application file for complete search history.

(56) References Cited

U.S. PATENT DOCUMENTS 4,864,153 A 9/1989 McIntosh, Jr.
6,144,790 A * 11/2000 Bledin ........................ 385/121

FOREIGN PATENT DOCUMENTS

DE 42 03 512 C1 * 5/1993
DE 196 12 065 A1 10/1997
EP 0 503 409 A2 9/1992

OTHER PUBLICATIONS

European Search Report dated Nov. 17, 2005 with English translation of relevant portion (four (4) pages).

* cited by examiner

*Primary Examiner*—Julie Lieu
(74) *Attorney, Agent, or Firm*—Crowell & Moring LLP

(57) ABSTRACT

A method for facilitating entry into or out of a motor vehicle is provided. A complete lowering of the window takes place after a double unlock command is provided along with a simultaneous or subsequent opening of the vehicle door.

8 Claims, 2 Drawing Sheets

METHOD AND SYSTEM FOR FACILITATING ENTRY INTO OR OUT OF A MOTOR VEHICLE

BACKGROUND AND SUMMARY OF THE INVENTION

This application claims the priority of German Application No. 100 11 851.8, filed Mar. 10, 2000, the disclosure of which is expressly incorporated by reference herein.

The invention relates to a method and a system for facilitating entry into or out of a motor vehicle where, after an unlock command, the window of a vehicle door is completely lowered and, after the closing of the vehicle door, the window is completely closed again. The complete lowering of the window takes place after a double unlock command, as well as a subsequent opening of the vehicle door.

For facilitating the entrance or exit in the case of narrow vehicle surroundings, for example, in narrow parking spaces, it is known, particularly in connection with frameless vehicle doors, to completely lower the window pane of a door. According to a known embodiment, a complete lowering of a door window takes place by a double unlock command, for example, sent by way of a radio key or by way of a command point at the door.

However, in this approach, it is a disadvantage that every time an unlock command is given twice, the vehicle window is lowered. It can therefore happen that a vehicle operator accidentally and unintentionally gives the unlock command twice and therefore carries out a complete lowering of the window of a vehicle door without entering the vehicle or even without being in the immediate proximity of the vehicle.

Furthermore, it is known in the case of frameless doors, particularly in the case of convertibles, to lower the window only a few centimeters when opening the door in order to move the window out of its sealing device. When the door is closed, the window is then moved up again in order to firmly press it against the door sealing device.

The present invention has the object of further developing the above-mentioned prior art, in which case the system has the purpose of preventing an unintentional opening of a vehicle window.

This object is achieved by providing a method of facilitating entrance into a motor vehicle, where, after an unlock command, the window of a vehicle door is completely lowered and, after the closing of the vehicle door, the window is completely closed again. The complete lowering of the window takes place after a double unlock command, as well as a subsequent opening of the vehicle door.

Accordingly, it is essential to the invention that, in addition to giving a double unlock command, the vehicle door must actually be opened. Only then will the window of the corresponding door be lowered completely so that a facilitated entrance into the vehicle will occur. After the closing of the door, the window of the vehicle door will then again be moved completely to the top.

According to a preferred embodiment, an anti-squeeze device, which is known per se, monitors the closing operation of the window after the closing of the vehicle door.

According to another advantageous embodiment, the unlock command can be given by way of a remote radio operation or by way of command point at the vehicle door. Suitable command points are, for example, conventional vehicle keys, radio keys or vehicle keys which can emit signals in a coded form in a different manner.

Other objects, advantages and novel features of the present invention will become apparent from the following detailed description of the invention when considered in conjunction with the accompanying drawings.

DETAILED DESCRIPTION OF THE DRAWINGS

Figure 1:
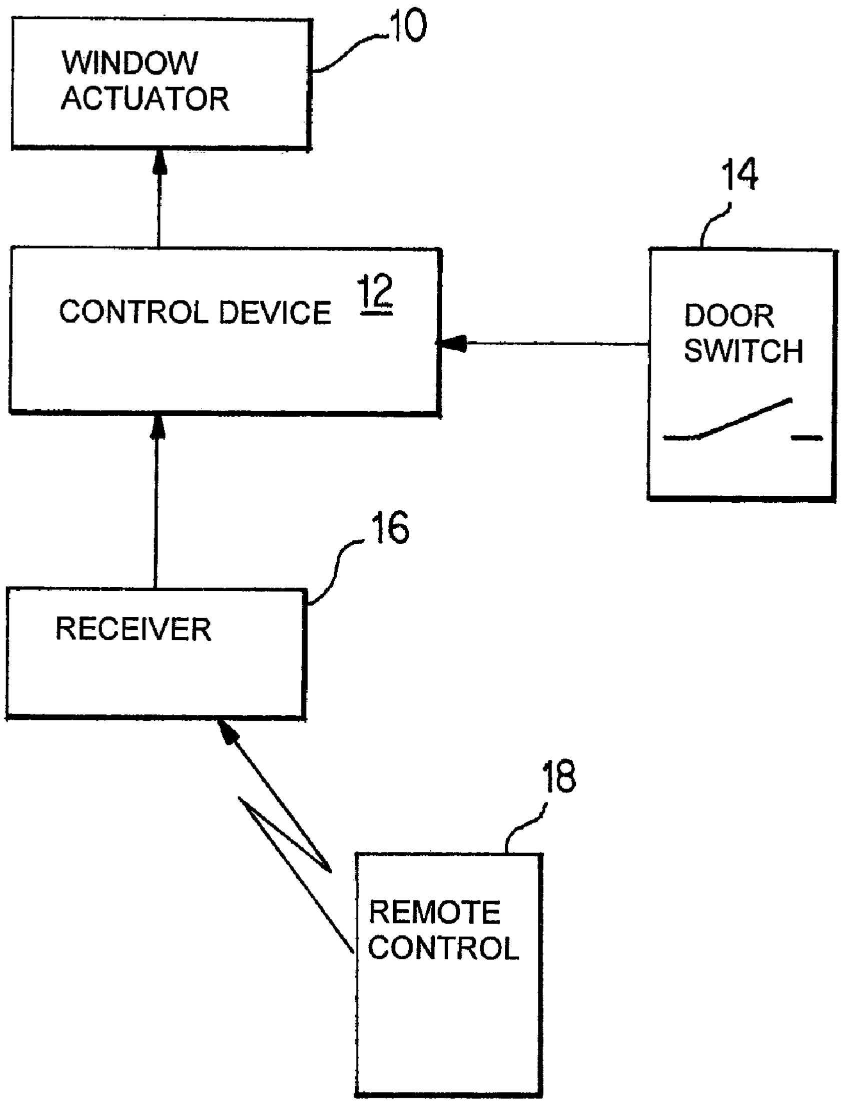
FIG. 1 is a block diagram illustrating a very simple embodiment of the present invention.

The system according to the invention, according to the embodiment in FIG. 1, comprises an electric window lift mechanism 10, which is acted upon by a control device 12. The control device 12 can be contained as a module in a vehicle control unit which is known per se. It is illustrated separately only for describing the present invention. The control device 12 comprises two inputs, by way of which signals arrive from a door contact switch 14 and the receiver of a remote radio operation 16. By way of a remote control 18, an unlock signal can be transmitted to the receiver 16. The signal is then transmitted by the receiver 16 to the control device 12. Furthermore, the control device 12 receives information from the door contact switch 14 as to whether the vehicle door is open or closed.

The control device 12 is constructed such that the electric window lift mechanism 10 will be operated for a complete lowering of the window when a double unlock command is given by way of the remote controller 18 and, simultaneously or subsequently, the door contact switch 14 signals that the door has been opened.

The completely lowered window then ensures an easier entrance into the vehicle, particularly in the case of frameless doors.

After the closing of the vehicle door, which is signalled by the door contact switch 14 to the control device 12, the window is then completely moved back to the top by means of the electric window lift mechanism 10.

An anti-squeeze device, which is known per se and which monitors the closing operation of the window, is not shown in this case. The anti-squeeze device can be integrated in the control device 12 or with the window lift motor 10.

Naturally, the present invention can also be implemented differently. For example, instead of or in addition to the receiver 16, a command point at a vehicle door can be used. Such a command point can be a conventional but electrically monitored lock. As an alternative, coded keys or encoded points can be used as command points. In addition, for example, instead of the door switch 14, an operation of the door handle can also be detected. In the present invention, it is only essential that, in addition to a double unlock command, the opening and closing of the door is also detected.

Figure 2:
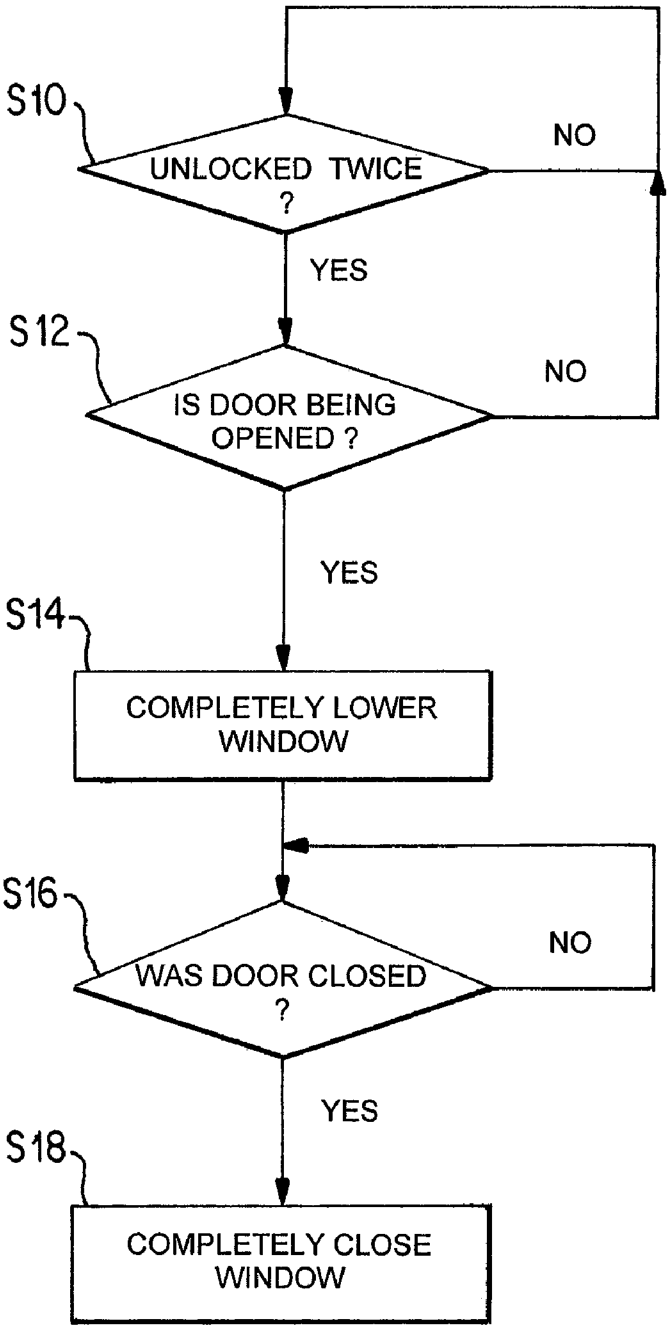
FIG. 2 is a flow chart of a method according to the present invention.

This is also illustrated in the flow chart shown in FIG. 2.

There, it is checked in step S10 whether a double unlock command is present. If this is not so, a return branching takes place. However, if it is so, the system checks in step S12 whether the vehicle door is opened. If this is not so, a return branching again takes place.

Otherwise, the window is completely lowered in step S14. Then, it is continuously checked whether the door was closed again (step S16). If this is not so, a loop takes place back to the start of step S16. However, if the door was closed (yes), a complete closing of the window is caused in step 18.

As much as possible, the present invention prevents a window from being unintentionally left open.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of facilitating entry into or out of a motor vehicle, the method comprising the acts of:

receiving a double unlock door command signal to unlock a vehicle door and to arm a complete window lowering operation for a window of the vehicle door;

detecting an actual opening of the vehicle door apart from an unlocking of the vehicle door;

automatically triggering the complete window lowering operation and lowering the window only upon the receipt of the double unlock door command and the subsequent detection of the opening of the vehicle door;

whereby the complete window lowering operation does not occur when the vehicle door is closed.

2. The method according to claim 1, further comprising the act of subsequently completely closing the window of the vehicle door after the vehicle door is closed.

3. The method according to claim 1, wherein the double unlock command is provided via at least one of a remote radio operation and a vehicle door command point actuation.

4. The method according to claim 2, wherein the act of completely closing the window of the vehicle door further comprises the act of monitoring the closing by an anti-squeeze device.

5. A system for facilitating entry into or out of a motor vehicle having at least one vehicle door, in which a window is lowerable and closeable, the system comprising:

an unlocking device for unlocking the vehicle door, the unlocking device issuing a double unlock command signal;

a door opening detection device providing door open and door closed signals:

a control device for controlling a window actuator; and wherein the control device has inputs which receive the double unlock command signal to arm a complete window lowering operation and the door open and door closed signals which correspond to an opening of the door and a closing of the door, said control device automatically triggering the complete window lowering operation and lowering the window of the vehicle door by operating the actuator only upon receiving the double unlock command signal and a subsequent door open signal; and whereby the complete window lowering operation does not occur when the vehicle door is closed.

6. The system according to claim 5, wherein said control device operates the actuator to completely close the window of the vehicle door after the vehicle door is closed.

7. The system according to claim 6, further comprising an anti-squeeze device which monitors the closing operating of the window.

8. The system according to claim 5, wherein the unlocking device comprises one of a remote-controlled operable device and a vehicle door command point.

* * * * *